(12) United States Patent
Kubota

(10) Patent No.: US 7,947,789 B2
(45) Date of Patent: May 24, 2011

(54) METHOD FOR PRODUCING FLUORINE-CONTAINING COPOLYMER AND SOIL RELEASE AGENT CONTAINING SAME

(75) Inventor: Kouji Kubota, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 447 days.

(21) Appl. No.: 11/630,133

(22) PCT Filed: Jun. 16, 2005

(86) PCT No.: PCT/JP2005/011048
§ 371 (c)(1),
(2), (4) Date: Dec. 20, 2006

(87) PCT Pub. No.: WO2006/001214
PCT Pub. Date: Jan. 5, 2006

(65) Prior Publication Data
US 2008/0027170 A1    Jan. 31, 2008

(30) Foreign Application Priority Data

Jun. 25, 2004  (JP) ................................. 2004-187844

(51) Int. Cl.
*C08F 2/44* (2006.01)
*C08F 20/22* (2006.01)
(52) U.S. Cl. .................. 526/209; 526/242; 526/245
(58) Field of Classification Search .............. 526/209, 526/242, 245
See application file for complete search history.

(56) References Cited

U.S. PATENT DOCUMENTS

| | | | |
|---|---|---|---|
| 4,861,860 A | 8/1989 | Ohishi et al. | |
| 5,143,991 A | 9/1992 | Amimoto et al. | |
| 5,387,640 A | 2/1995 | Michels et al. | |
| 6,274,060 B1 | 8/2001 | Sakashita | |
| 6,387,292 B1 | 5/2002 | Saito | |
| 2004/0147665 A1 | 7/2004 | Yoshioka et al. | |

FOREIGN PATENT DOCUMENTS

| | | | |
|---|---|---|---|
| EP | 1 380 628 A1 | | 1/2004 |
| JP | 59152909 A | * | 8/1984 |
| JP | 59-204980 | | 11/1984 |
| JP | 3-103411 | | 4/1991 |
| JP | 6-287548 A | | 10/1994 |
| JP | 11-49825 | | 2/1999 |
| JP | 11049825 A | * | 2/1999 |
| JP | 2000-290640 A | | 10/2000 |
| JP | 2001-106711 A | | 4/2001 |
| JP | 2003268039 A | * | 9/2003 |
| WO | 03/054284 A1 | | 7/2003 |

OTHER PUBLICATIONS

Translation to Yamana et al. (JP 11049825), 1999.*
Translation to Nishida et al. (JP 59152909), 1984.*
"Preliminary Risk Assessment of the Developmental Toxicity Associated with Exposure to Perfluorooctanoic Acid and its Salts"; U.S. Environmental Protection Agency Office of Pollution Prevention and Toxics Risk Assessment Division; Apr. 10, 2003.
"EPA Intensifies Scientific Investigation of a Chemical Processing Aid"; EPA Environmental News; United States Environmental Protection Agency; Monday, Apr. 14, 2003.
EPA OPPT Fact Sheet; United States Environmental Protection Agency; Apr. 14, 2003.
"Perfluorooctanoic Acid (PFOA), Fluorinated Telomers; Request for Comment, Solicitation of Interested Parties for Enforceable Consent Agreement Development, and Notice of Public Meeting"; United States Environmental Protection Agency; Federal Register; vol. 68, No. 73; Wednesday, Apr. 16, 2003; pp. 18626-18633.

* cited by examiner

*Primary Examiner* — Kelechi C Egwim
(74) *Attorney, Agent, or Firm* — Sughrue Mion, PLLC

(57) ABSTRACT

Disclosed is a method for producing a fluorine-containing copolymer composition wherein a fluorine-containing copolymer is produced by polymerizing 1-99 weight % of a monomer mixture (A) containing a polymerizable monomer having a fluoroalkyl group and a polymerizable monomer having a hydrophilic group in the presence of 1-99 weight % of a surfactant (B) containing a surfactant having an oxyalkylene group. The total amount of the monomer mixture (A) and the surfactant (B) is not less than 80 weight % of the polymerization system.

10 Claims, No Drawings

METHOD FOR PRODUCING FLUORINE-CONTAINING COPOLYMER AND SOIL RELEASE AGENT CONTAINING SAME

TECHNICAL FIELD

The present invention relates to a soil release agent used for a textile and the like and a method of producing said agent.

BACKGROUND ART

As a soil release agent (also referred to as "SR agent") which makes easier to remove a soil adhered to a treated article such as a textile, known are various copolymer compositions which mainly contain a fluoroalkyl group-containing polymerizable monomer and a hydrophilic group-containing polymerizable monomer (cf. JP-A-59-204980, JP-A-3-103411 and JP-A-11-49825).

In processes of obtaining these polymers, a polymerization method using a large amount of an organic solvent has been used for the purpose of homogeneously dissolving the monomers, since practically the fluoroalkyl group-containing polymerizable monomer and the hydrophilic group-containing polymerizable monomer frequently have properties of not being compatible with each other.

The polymerization method using a large amount of an organic solvent, however, has the problem that, when the organic solvent is retained, the content of VOC (Volatile Organic Compound) in the soil release agent is large and/or the soil release agent is highly flammable and that, when the organic solvent is removed after the polymerization, a step of removing the organic solvent for a long time is necessary so that the soil release agent cannot be efficiently produced.

Patent document 1: JP-A-59-204980
Patent document 2: JP-A-3-103411
Patent document 3: JP-A-11-49825

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid) is proved to have a danger to burden the environment. Under such a situation, EPA announced on Apr. 14, 2003 that the scientific investigation on PFOA should be more intensively executed.

On the other hand, the Federal Register (FR Vol. 68, No. 73/Apr. 16, 2003 [FRL-7303-8], http://www.epa.gov/opptintr/pfoa/pfoafr.pdf),
EPA Environmental News FOR RELEASE: MONDAY APRIL 14, 2003 EPA INTENSIFIES SCIENTIFIC INVESTIGATION OF A CHEMICAL PROCESSING AID (http://www.epa.gov/opptintr/pfoa/pfoaprs.pdf) and EPA OPPT FACT SHEET Apr. 14, 2003 (http://www.epa.gov/opptintr/pfoa/pfoafacts.pdf) have published that telomers have a possibility to produce PFOA when decomposed or metabolized, and also that telomers have been widely used in foam fire extinguishers, care products, washing materials, carpets, textiles, paper, leather, etc., in order to impart-water and oil repellency and soil resistance to them.

DISCLOSURE OF THE INVENTION

Problems to be Solved by the Invention

An object of the present invention is to provide a method of efficiently producing a soil release agent having a small VOC content with hardly using an organic solvent.

Means for Solving the Problems

The present invention adopt a surfactant instead of an organic solvent. The surfactant does not have the effect of solving individual polymerizable monomers as in the organic solvent, but the surfactant acts to disperse and solubilize a fluoroalkyl group-containing polymerizable monomer and a hydrophilic group-containing polymerizable which are not compatible each other to give a homogeneous mixture so that a polymerization initiating source can act to copolymerize them.

The present invention provides a method of producing a fluorine-containing copolymer composition, which comprises polymerizing:
(A) 1 to 99% by weight of a monomer mixture comprising a polymerizable monomer containing a fluoroalkyl group and a polymerizable monomer containing a hydrophilic group, in the presence of (B) 99 to 1% by weight of a surfactant comprising a surfactant containing an oxyalkylene group, to produce a fluorine-containing copolymer,
wherein % by weight is based on the total of the components (A) and (B), and
wherein the total amount of the monomer mixture (A) and the surfactant (B) is at least 80% by weight based on a polymerization system.

The fluorine-containing copolymer composition essentially consists of the fluorine-containing copolymer and the surfactant (B).

A soil release agent can be obtained by adding water to the fluorine-containing copolymer composition to form an emulsion of fluorine-containing copolymer dispersed in water (an oil-in-water emulsion). At this time, an additional surfactant may be newly added, if necessary. Polyalkylene glycol may be previously mixed with the fluorine-containing copolymer composition of the present invention before the dispersing in water, in order to decrease the viscosity of the copolymer to facilitate the dispersing in water.

Effects of the Invention

In the present invention, the organic solvent, which was conventionally required to be used in a large amount, is hardly used, and a step of eliminating the organic solvent for a long time is unnecessary so that a soil release agent having a low VOC content can be efficiently produced.

Mode of Carrying Out the Invention

In the present invention, the monomer mixture which contains the fluoroalkyl group-containing polymerizable monomer and the hydrophilic group-containing polymerizable monomer as the main components is copolymerized by the action of the polymerization initiating source. If necessary, a blend comprising the monomer mixture (A) and the surfactant (B) may be heated to at least 60° C., or may be emulsified or homogenized by a forced emulsifying machine such as a homogenizer. The amount of the surfactant may be at most 70% by weight, for example, at most 50% by weight, particularly at most 30% by weight, and at least 2% by weight, for example, at least 3% by weight, particularly at least 5% by weight, based on the total of the components (A) and (B).

A polyalkylene glycol having an average molecular weight of 200 to 5,000 may be added in the amount of 5 to 200 parts by weight based on 100 parts by weight of the fluorine-containing copolymer (that is, 100 parts by weight of the monomer mixture (A)) in order to decrease the viscosity during and after the polymerization. The polyalkylene glycol is particularly preferable polyethylene glycol. The time of addition may be before the polymerization, during the polymerization or after the polymerization.

The fluoroalkyl group-containing polymerizable monomer may be a (meth)acrylate. The fluoroalkyl group-containing polymerizable monomer may be, for example, a monomer represented by general formula 1:

$$H_2C=CXCOO—Y-Rf$$

wherein X is a hydrogen atom, a methyl group, a fluorine atom, a chlorine atom, a bromine atom, a iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched fluoroalkyl group having 1 to 21 carbon atoms.

In general formula 1, the Rf group is preferably a perfluoroalkyl group. The carbon number of the Rf group may be from 1 to 12, for example, from 1 to 6, particularly from 1 to 4. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, $(CF_2)_2CF(CF_3)_2$, —$CF_2C(CF_3)_3$, $CF(CF_3)CF_2CF_2CF_3$, —$(CF_2)_5CF_3$, —$(CF_2)_3CF(CF_3)_2$, $(CF_2)_4CF(CF_3)_2$, —$(CF_2)_7CF_3$, —$(CF_2)_5CF(CF_3)_2$, $(CF_2)_6CF(CF_3)_2$, —$(CF_2)_9CF_3$ and —$(CF_2)_{11}CF_3$.

Examples of general formula 1 include the followings, to which the present invention is not limited.

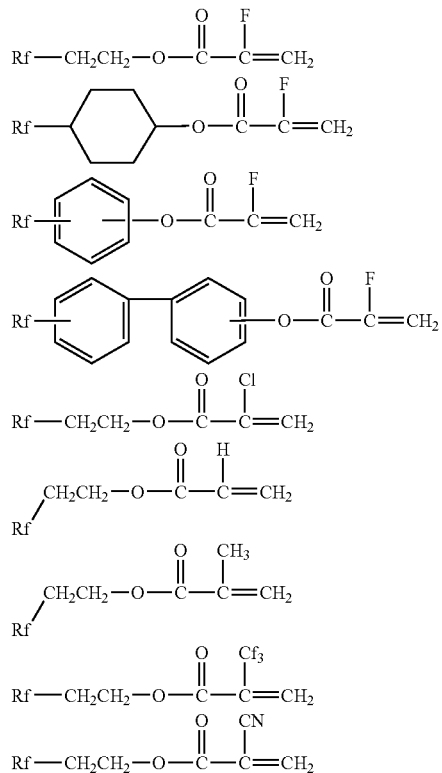

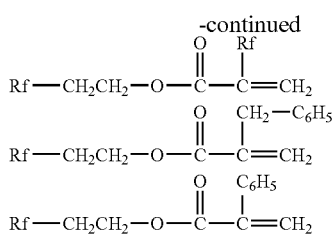

wherein Rf is a linear or branched fluoroalkyl group having 1 to 21 carbon atoms.

The fluoroalkyl group-containing polymerizable monomer may be a mixture of at least two.

In the hydrophilic group-containing polymerizable monomer, the hydrophilic group is preferably an oxyalkylene group (which is preferably an oxyethylene group or an oxypropylene group) (the number of the oxyalkylene groups may be, for example, from 1 to 50.).

The hydrophilic group-containing polymerizable monomer may be, for example, a monomer represented by general formula 2:

$$H_2C=CXCOO—(RO)_n—X$$

wherein X is a hydrogen atom or a methyl group,
R is an alkylene group having 2 to 6 carbon atoms, and
n is an integer of 1 to 50.

Specific examples of general formula 2 include the followings, to which the present invention is not limited:

$H_2C=CHCOO—CH_2CH_2O—H$ $H_2C=C(CH_3)COO—CH_2CH_2O—H$ $H_2C=CHCOO—(CH_2CH_2O)_9—H$ $H_2C=C(CH_3)COO—(CH_2CH_2O)_9—H$ $H_2C=C(CH_3)COO—(CH_2CH_2O)_9—CH_3$ $H_2C=C(CH_3)COO—(CH_2CH_2O)_5—CH_3$ $H_2C=C(CH_3)COO—(CH_2CH(CH_3)O)_9—H$ $H_2C=CHCOO—(CH_2CH(CH_3)O)_9—H$ $H_2C=C(CH_3)COO—(CH_2CH(CH_3)O)_9—CH_3$ $H_2C=C(CH_3)COO—(CH_2CH(CH_3)O)_{12}—CH_3$ $H_2C=C(CH_3)COO—(CH_2CH(CH_3)O)_{40}—CH_3$ $H_2C=C(CH_3)COO—(CH_2CH_2O)_5—(CH_2CH(CH_3)O)_3—CH_3$

The hydrophilic group-containing polymerizable monomer may be a mixture of at least two.

In the copolymer of the present invention, the amount of the fluoroalkyl group-containing polymerizable monomer is preferably in the range from 20 to 90% by weight, particularly from 30 to 80% by weight, based on the total of the fluoroalkyl group-containing polymerizable monomer and the hydrophilic group-containing polymerizable monomer (particularly the copolymer). The amount of 20% by weight to 90% by weight can prevent the penetration of oily soil and can give high soil releasability because of the presence of the hydrophilicity. Accordingly, the amount of the hydrophilic group-containing polymerizable monomer is preferably in the range from 10 to 80% by weight particularly from 20 to 70% by weight, based on the total of the fluoroalkyl group-containing polymerizable monomer and the hydrophilic group-containing polymerizable monomer.

The copolymer of the present invention may contain another polymerizable monomer for the purpose of improving the durability of soil releasability and the like. The amount of the other polymerizable monomer may be preferably from 0 to 40% by weight, for example, from 0.5 to 20% by weight, based on the copolymer. That is, the total amount of the fluoroalkyl group-containing polymerizable monomer and the hydrophilic group-containing polymerizable monomer may be at least 60% by weight, particularly at least 80% by weight, based on the monomer mixture (A). The other polymerizable monomer may be a mixture of at least two.

Specific examples of the other polymerizable monomer include, for example, diacetoneacrylamide, (meth)acrylamide, N-methylolacrylamide, hydroxymethyl (meth)acrylate, 3-chloro-2-hydroxypropyl(meth)acrylate, N,N-dimethylaminoethyl(meth)acrylate, N,N-diethylamino-ethyl (meth)acrylate, butadiene, chloroprene, glycidyl (meth)acrylate, maleic acid derivative, vinyl chloride, glycerol (meth) acrylate, styrene, acetoacetoxyethyl (meth)acrylate and alkyl (meth)acrylate, to which the present invention is not limited.

The average molecular weight of the fluorine-containing copolymer may be from 1,000 to 1,000,000, preferably from 5,000 to 200,000. The average molecular weight of 1,000 to 1,000,000 can give sufficient soil releasability and can give low viscosity of treatment liquid imparting the good handling. The average molecular weight is measured by a gel permeation chromatography in terms of polystyrene.

The copolymer of the present invention may be any of a random copolymer, a block copolymer and a graft copolymer.

The surfactant (B) comprises a surfactant containing an oxyalkylene group (wherein the alkylene group has 2 to 6, particularly 2 or 3 carbon atoms). The oxyalkylene group-containing surfactant may be various surfactants such as anionic, cationic, nonionic and amphoteric surfactants, and is particularly preferably nonionic. The oxyalkylene group-containing surfactant is preferably one having an HLB value of at most 12 or an average molecular weight of at most 400. In the oxyalkylene group-containing surfactant, the number of the oxyalkylene group may be from 1 to 50, for example, from 2 to 20.

The surfactant (B) may contain another anionic, cationic, nonionic or amphoteric surfactant in addition to the oxyalkylene group-containing surfactant. The amount of the other surfactant may be at most 50% by weight, for example, at most 10% by weight, based on surfactant (B).

Specific examples of the surfactant include polyoxyalkylene isodecyl ether, polyoxyethylene isotridecyl ether, polyoxyethylene lauryl ether, polyoxyethylene sec-alkyl ether and polyoxyethylenepolyoxypropylene cetyl ether.

If a homogeneous mixture comprising the monomer and the surfactant can be prepared to obtain the copolymer of the present invention, it is possible to arbitrarily select various modes and conditions of polymerization reaction. The polymerization can be conducted, for example, at 60 to 120° C. for 1 to 10 hours. For example, there is used the mode wherein the composition comprising the monomer mixture (A) and surfactant (B) is previously prepared and then said composition and the polymerization initiator are continuously fed into a reaction vessel (for example, a batch reaction vessel and a reaction tube) to conduct the polymerization.

The action of the polymerization initiating source (that is, a polymerization initiator) can copolymerize the monomers. The polymerization initiating source includes, for example, a polymerization initiator such as a peroxide compound, an azo compound and a persulfate compound. The amount of the polymerization initiating source may be at most 10% by weight, for example, from 0.01 to 2.00% by weight, based on the amount of the monomer mixture (A).

If necessary, an organic solvent, a chain transfer agent, water and a water-soluble polymer may be used at the polymerization in addition to the monomer mixture (A), the surfactant (B) and the polymerization initiator. The polymerization system comprises the monomer mixture (A), surfactant (B) and the polymerization initiator, and optionally, an organic solvent, a chain transfer agent, water and a water-soluble polymer. The total amount of the monomer mixture (A) and the surfactant (B) may be at least 80% by weight, generally at least 85% by weight, for example, at least 90% by weight, particularly at least 95% by weight, especially at least 98% by weight, based on the polymerization system.

Preferably, the use of an organic solvent is substantially excluded (the amount of the organic solvent is at most 1.0% by weight, particularly at most 0.5% by weight, based on the total of the component (A) and the component (B)), particularly, entirely excluded (the amount of the organic solvent is at most 0.2% by weight, particularly at most about 0.01% by weight, based on the total of the component (A) and the component (B)), for the purpose of effectively exploiting the present invention. However, the organic solvent may be added before the polymerization in a small amount (at most 5% by weight, particularly at most 1% by weight, based on the total of the component (A) and the component (B)), for the purpose of dissolving the polymerization initiator and the like. Specific examples of the organic solvent include ketones such as acetone and methyl ethyl ketone; esters such as ethyl acetate and methyl acetate; glycols such as propylene glycol, dipropylene glycol monomethyl ether, dipropylene glycol and tripropylene glycol; alcohols such as ethyl alcohol and isopropanol; and N-methyl-2-pyrrolidone.

The chain transfer agent may be a mercapto group-containing compound for the purpose of adjusting the molecular weight at the copolymerization. Specific examples thereof include 2-mercptoethanol and alkyl mercaptan. The amount of the chain transfer agent may be at most 3% by weight, particularly at most 1% by weight, based on the total of the components (A) and (B).

Water and the water-soluble polymer may be added before the polymerization in a small amount (at most 5% by weight, particularly at most 1% by weight, based on the total of the components (A) and (B)). Specific examples of the water-soluble polymer include poly(meth)acrylic acid, cationated cellulose and polyvinyl alcohol.

The fluorine-containing copolymer composition of the present invention is dispersed in water to give a soil release agent. The amount of water in the soil release agent may be, for example, from 10 to 95% by weight. Various surfactants such as anionic, cationic, nonionic and amphoteric surfactants may added and the water-soluble polymer such as poly (meth)acrylic acid, cationated cellulose and polyvinyl alcohol may be added at the step of dispersion in water. Particularly, the addition of the cationic surfactant is preferable, and the content of the cationic surfactant is preferably from 0.1 to 10.0% by weight in the soil release agent. A forced emulsifying machine such as a mixer and a homogenizer in addition to the usual mixing may be used for the dispersion step.

The soil release agent of the present invention may have a VOC content of at most 3% by weight, for example, at most 1% by weight, particularly at most 0.5% by weight, especially 0%. In addition, the soil release agent of the present invention may contain 1 to 50% by weight of an alkylene glycol having an average molecular weight of 200 to 5,000.

The soil release agent of the present invention is optionally diluted with water and can be applied to a substrate (an article to be treated) such as a textile by an arbitrary method. Examples of application method include an immersion coating and a spray coating. The soil release agent is adhered to the substrate so the treated substrate exhibits the soil releasability.

If necessary, another blender can be used. Examples of the blender include water- and oil-repellent agents, crease-proofing agents, shrink-proof agents, antimicrobial agents, pigments and paints.

The substrate, to which the soil release agent of the present invention has been applied, may be subjected to the curing, if necessary.

The substrate is not limited and includes a textile, masonry, a filter (for example, an electrostatic filter), a dust protective mask, glass, paper, wood, leather, fur, asbestos, brick, cement, metal and oxide, ceramics, plastics, a coated surface and a plaster, to which the substrate is not limited.

EXAMPLES

The following Examples, Comparative Examples and Test Examples are specifically illustrated but, of course, are not to be construed to limit the scope of the invention.

Soil releasability and oil repellency are measured in the following procedures:

Soil Releasability

The test for the soil releasability is conducted by using a textile as follows. A test cloth in 7 cm×7 cm square is spread on a piece of blotting paper horizontally spread and then one drop of a soil which is a dispersion of carbon black (0.1% by weight) in triolein is dropped on the test cloth. A polyethylene sheet is positioned on the test cloth and a weight of 500 g is positioned on the polyethylene sheet. After 60 seconds, the weight and the polyethylene sheet are removed. The test cloth is kept standing at a room temperature for 1 hour to adhere a soil to the test cloth. The test cloth and a ballast cloth together having a total weight of 500 g, and a cleaning agent (12.5 g) (trade name: SUPER COMPACT TOP manufactured by Lion Corporation) are charged into an electrical washer. The test cloth is washed at a bath amount of 25 L and a bath temperature of 40° C. for 5 minutes, then rinsed and dried at room temperature. The state of the remaining stain of the dried test cloth is compared with a standard photograph plate so that the soil releasability is expressed by the corresponding determined grade (cf. Table 1). The standard photograph plate is one according to AATCC-TM130-2000 (American Association of Textile Chemists and Colorists, Test Method 130-2000)

TABLE 1

| Determined grade of soil releasability | |
|---|---|
| Determined grade | Criteria |
| 1.0 | Stain remarkably remains |
| 2.0 | Stain considerably remains |
| 3.0 | Stain slightly remains |
| 4.0 | Stain is not noticeable |
| 5.0 | Stain does not remain |

Oil Repellency

The oil repellency test is conducted by using a textile according to AATCC-TM118-2000. The test cloth is spread horizontally and a test liquid shown in Table 2 is dropped on the test cloth. The penetration state is determined after 30 seconds. When the oil repellency is low, an oily soil is penetrated into the treated article so that the removal of the soil is difficult. Thus, the oil repellency is an important evaluation indication in the same position as the soil releasability (SR property).

TABLE 2

| Determined grade of oil repellency | | |
|---|---|---|
| Oil repellency | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| 0 | Inferior to 1 | — |

Soil release agents were produced as in the following Preparative Examples:

Preparative Example 1

$CF_3CF_2(CF_2CF_2)_nCH_2CH_2OOCCH=CH_2$ (a mixture of compounds wherein n is 3, 4 and 5, an average of n is 3.1) (31 g), $CH_3—(OCH_2CH_2)_8—OOCC(CH_3)=CH_2$ (15 g), 3-chloro-2-hydroxypropyl methacrylate (4 g), polyoxyethylene (3) isotridecyl ether (50 g), 2-mercaptoethanol (0.3 g) were mixed in a four-necked flask and the mixture was heated at 80° C. with stirring to give a homogeneous mixture liquid. Oxygen in the system was sufficiently substituted with nitrogen, and then 2,2'-azobisisobutyronitrile (0.3 g) was added and the copolymerization reaction was conducted at 80° C. for 5 hours with stirring to give a fluorine-containing copolymer. Then alkyltrimethyl ammonium chloride (2.5 g) and ion exchanged water were added and the mixture is sufficiently dispersed at 80° C. by a mixer to give a soil release agent composition having a fluorine-containing copolymer content of 20% by weight. The ingredients of the soil release agent are shown in Table 3.

Preparative Example 2

The same procedure as in Preparative Example 1 was repeated to give a soil release agent except that polyoxyethylene (3) isotridecyl ether was changed to polyoxyethylene (4) isodecyl ether. The ingredients of the soil release agent are shown in Table 3.

Preparative Example 3

The same procedure as in Preparative Example 1 was repeated to give a soil release agent except that the addition amount of polyoxyethylene(3)isotridecyl ether was changed to 12.5 g. The ingredients of the soil release agent are shown in Table 3.

Comparative Preparative Example 1

The same procedure as in Preparative Example 1 was repeated to give a soil release agent except that the addition amount of polyoxyethylene (3) isotridecyl ether was changed to 0 g. The ingredients of the soil release agent are shown in Table 3.

Preparative Example 4

The same procedure as in Preparative Example 1 was repeated to give a soil release agent except that $CF_3CF_2(CF_2CF_2)_nCH_2CH_2OOCCH=CH_2$ (a mixture of compounds wherein n is 3, 4 and 5, an average of n is 3.1) was changed to $C_4F_9CH_2CH_2OCOCCl=CH_2$. The ingredients of the soil release agent are shown in Table 3.

Comparative Preparative Example 2

The same procedure as in Preparative Example 1 was repeated to give a soil release agent except that $CH_3—(OCH_2CH_2)_8—OOCC(CH_3)=CH_2$ was changed to $C_{18}H_{37}—OOCCH=CH_2$. The ingredients of the soil release agent are shown in Table 3.

Preparative Example 5

$CF_3CF_2(CF_2CF_2)_nCH_2CH_2OOCCH=CH_2$ (a mixture of compounds wherein n is 3, 4 and 5, an average of n is 3.1) (31 g), $CH_3—(OCH_2CH_2)_8—OOCC(CH_3)=CH_2$ (15 g), 3-chloro-2-hydroxypropyl methacrylate (4 g), polyoxyethylene (3) isotridecyl ether (50 g), 2-mercaptoethanol (0.3 g) were mixed in a four-necked flask and the mixture was heated at 80° C. with stirring to give a homogeneous mixture liquid. Oxygen in the system was sufficiently substituted with nitrogen, and then 2,2'-azobisisobutyronitrile (0.3 g) was added and the copolymerization reaction was conducted at 80° C. for 5 hours with stirring to give a fluorine-containing copolymer. Then, polyethylene glycol(300) (25 g), alkyltrimethyl ammonium chloride (2.5 g) and ion exchanged water were added and the mixture is sufficiently dispersed at 80° C. by a mixer to give a soil release agent composition having a fluorine-containing copolymer content of 20% by weight. The ingredients of the soil release agent are shown in Table 3.

Preparative Example 6

The same procedure as in Preparative Example 5 was repeated to give a soil release agent except that $CF_3CF_2(CF_2CF_2)_nCH_2CH_2OOCCH=CH_2$ (a mixture of compounds wherein n is 3, 4 and 5, an average of n is 3.1) was changed to $C_4F_9CH_2CH_2OCOCH=CH_2$ and polyoxyethylene (3) isotridecyl ether was changed to polyoxyethylene (4) isodecyl ether. The ingredients of the soil release agent are shown in Table 3.

Preparative Example 7

The same procedure as in Preparative Example 6 was repeated to give a soil release agent except that polyoxyethylene (4) isodecyl ether was changed to polyoxyethylene (1) polyoxypropylene (4) cetyl ether. The ingredients of the soil release agent are shown in Table 3.

Treatments comprising the soil release agents were conducted as in the following Examples and Comparative Examples.

Example 1

The soil release agent (4 g) prepared in Preparative Example 1 and water (96 g) were mixed to give a treatment liquid. A cotton twill cloth and a 65% polyester/35% cotton mixture twill cloth were immersed in this treatment liquid and squeezed by rolls to give a wet pickup of 60 mass % and 55 mass %, respectively. The clothes were dried at 110° C. for 2 minutes and heat-treated at 160° C. for 1 minute to complete the treatment with the soil release agent. The soil releasability and the oil repellency of these clothes were measured. The results are shown in Table 4.

Examples 2 to 7 and Comparative Examples 1 to 2

The test procedure as in Example 1 was repeated except that the soil release agent was changed to each of those obtained in Preparative Examples 2 to 7 and Comparative Preparative Examples 1 to 2. The results are shown in Table 4.

TABLE 3

Ingredients of soil release agent

| | | Pre. Ex. | | | | | | | Com. Pre. Ex. | |
|---|---|---|---|---|---|---|---|---|---|---|
| | | 1 | 2 | 3 | 4 | 5 | 6 | 7 | 1 | 2 |
| Monomer | $CF_3CF_2(CF_2CF_2)_{3.1}CH_2CH_2OOCCH=CH_2$ | 31 g | 31 g | 31 g | | 31 g | | | 31 g | 31 g |
| | $C_4F_9CH_2CH_2OCOCCl=CH_2$ | | | | 31 g | | | | | |
| | $C_4F_9CH_2CH_2OCOCH=CH_2$ | | | | | | 31 g | 31 g | | |
| | $CH_3—(OCH_2CH_2)_8—OOCC(CH_3)=CH_2$ | 15 g | 15 g | 15 g | 15 g | 15 g | 15 g | 15 g | 15 g | |
| | 3-Chloro-2-hydroxypropylmethacrylate | 4 g | 4 g | 4 g | 4 g | 4 g | 4 g | 4 g | 4 g | 4 g |
| | $C_{18}H_{37}—OOCCH=CH_2$ | | | | | | | | | 15 g |
| Surfactant | POE(3)isotridecyl ether | 50 g | | 12.5 g | 50 g | 50 g | | | | 50 g |
| | POE(4)isodecyl ether | | 50 g | | | | 50 g | | | |
| | POE(1)POP(4) cetyl ether | | | | | | | 50 g | | |
| Chain transfer agent | 2-Mercaptoethanol | 0.3 g | 0.3 g | 0.3 g | 0.3 g | 0.3 g | 0.3 g | 0.3 g | 0.3 g | 0.3 g |
| Polymerization initiator | 2,2'-Azobisisobutyronitrile | 0.3 g | 0.3 g | 0.3 g | 0.3 g | 0.3 g | 0.3 g | 0.3 g | 0.3 g | 0.3 g |
| Surfactant | Alkyltrimethyl ammonium chloride | 2.5 g | 2.5 g | 2.5 g | 2.5 g | 2.5 g | 2.5 g | 2.5 g | 2.5 g | 2.5 g |
| Water-soluble polymer | Polyethylene glycol (300) | | | | | 25 g | 25 g | 25 g | | |
| | Ion exchanged water | 149.9 g | 149.9 g | 187.4 g | 149.9 g | 124.9 g | 124.9 g | 124.9 g | 199.9 g | 149.9 g |

TABLE 4

Soil releasability and oil repellency

| Fiber type | Example | Soil release agent | Soil releasability | Oil repellency |
|---|---|---|---|---|
| Cotton twill cloth | Ex. 1 | Pre. Ex. 1 | 5.0 | 5 |
|  | Ex. 2 | Pre. Ex. 2 | 5.0 | 5 |
|  | Ex. 3 | Pre. Ex. 3 | 5.0 | 5 |
|  | Ex. 4 | Pre. Ex. 4 | 4.0 | 4 |
|  | Ex. 5 | Pre. Ex. 5 | 5.0 | 5 |
|  | Ex. 6 | Pre. Ex. 6 | 4.0 | 4 |
|  | Ex. 7 | Pre. Ex. 7 | 4.0 | 4 |
|  | Com. Ex. 1 | Com. Pre. Ex. 1 | 2.0 | 2 |
|  | Com. Ex. 2 | Com. Pre. Ex. 2 | 1.0 | 2 |
| Mixture twill cloth of 65% polyester/35% cotton | Ex. 1 | Pre. Ex. 1 | 5.0 | 6 |
|  | Ex. 2 | Pre. Ex. 2 | 5.0 | 6 |
|  | Ex. 3 | Pre. Ex. 3 | 5.0 | 6 |
|  | Ex. 4 | Pre. Ex. 4 | 4.0 | 5 |
|  | Ex. 5 | Pre. Ex. 5 | 5.0 | 6 |
|  | Ex. 6 | Pre. Ex. 6 | 4.0 | 5 |
|  | Ex. 7 | Pre. Ex. 7 | 4.0 | 5 |
|  | Com. Ex. 1 | Com. Pre. Ex. 1 | 3.0 | 3 |
|  | Com. Ex. 2 | Com. Pre. Ex. 2 | 1.0 | 3 |

The invention claimed is:

1. A method of producing a fluorine-containing copolymer composition, which comprises polymerizing a polymerization system comprising:
   a monomer mixture (A), the surfactant (B) and a polymerization initiator;
   (A) 1 to 99% by weight of a monomer mixture comprising a polymerizable monomer containing a fluoroalkyl group and a polymerizable monomer containing a hydrophilic group represented by general formula 2:

$H_2C=CXCOO-(RO)_n-X$ wherein X is a hydrogen atom or a methyl group,
   R is an alkylene group having 2 to 6 carbon atoms, and
   n is an integer of 1 to 50, and
   (B) 1 to 99% by weight of a surfactant comprising a surfactant containing an oxyalkylene group,
   to produce a fluorine-containing copolymer,
   wherein % by weight is based on the total of the components (A) and (B);
   wherein the total amount of the monomer mixture (A) and the surfactant (B) is at least 80% by weight based on the polymerization system;
   wherein the polymerization system contains the polymerization initiator, an organic solvent, a chain transfer agent, water and a water-soluble polymer in a total amount of not more than 20% by weight based on the polymerization system; and
   wherein the surfactant containing an oxyalkylene group, constituting from 1 to 99% by weight of the surfactant (B), is a saturated compound.

2. The method according to claim 1, wherein an organic solvent is not substantially used.

3. The method according to claim 1, wherein the monomer mixture (A) contains, in addition to the fluoroalkyl group-containing polymerizable monomer and the hydrophilic group-containing polymerizable monomer, another polymerizable monomer copolymerizable therewith.

4. The method according to claim 1, wherein the total amount of the fluoroalkyl group-containing polymerizable monomer and the hydrophilic group-containing polymerizable monomer is at least 60% by weight, based on the monomer mixture (A).

5. The method according to claim 1, which comprises, before the polymerization, during the polymerization or after the polymerization, adding polyalkylene glycol having an average molecular weight of 200 to 5,000 in the amount of 5 to 200 parts by weight, based on 100 parts by weight of the fluorine-containing copolymer.

6. The method according to claim 1, wherein the fluoroalkyl group-containing polymerizable monomer is represented by the general formula 1:

$H_2C=CXCOO-Y-Rf$ wherein X is a hydrogen atom, a methyl group, a fluorine atom, a chlorine atom, a bromine atom, a iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
Y is an aliphatic group having 1 to 10 carbon atoms, an aromatic or cycloaliphatic group having 6 to 10 carbon atoms, a $-CH_2CH_2N(R^1)SO_2-$ group (in which $R^1$ is an alkyl group having 1 to 4 carbon atoms) or a $-CH_2CH(OY^1)CH_2-$ group (in which $Y^1$ is a hydrogen atom or an acetyl group); and
Rf is a linear or branched fluoroalkyl group having 1 to 21 carbon atoms.

7. The method according to claim 1, wherein the oxyalkylene group-containing surfactant has an HLB value of at most 12 or an average molecular weight of at most 400.

8. The method according to claim 1, wherein a composition comprising the monomer mixture (A) and the surfactant (B) is previously prepared and then said composition and the polymerization initiator are continuously charged into a reactor to conduct the polymerization.

9. The method according to claim 1, wherein the polymerization system contains at least one component selected from the group consisting of a chain transfer agent, water and a water-soluble polymer.

10. The method according to claim 1, wherein the surfactant containing an oxyalkylene group, constituting from 1 to 99% by weight of the surfactant (B), is selected from the group consisting of polyoxyalkylene isodecyl ether, polyoxyethylene isotridecyl ether, polyoxyethylene lauryl ether, polyoxyethylene sec-alkyl ether and polyoxyethylenepolyoxypropylene cetyl ether.

* * * * *